G. L. RICHARDSON.
Combined Hay Fork and Balance.
No. 223,296. Patented Jan. 6, 1880.
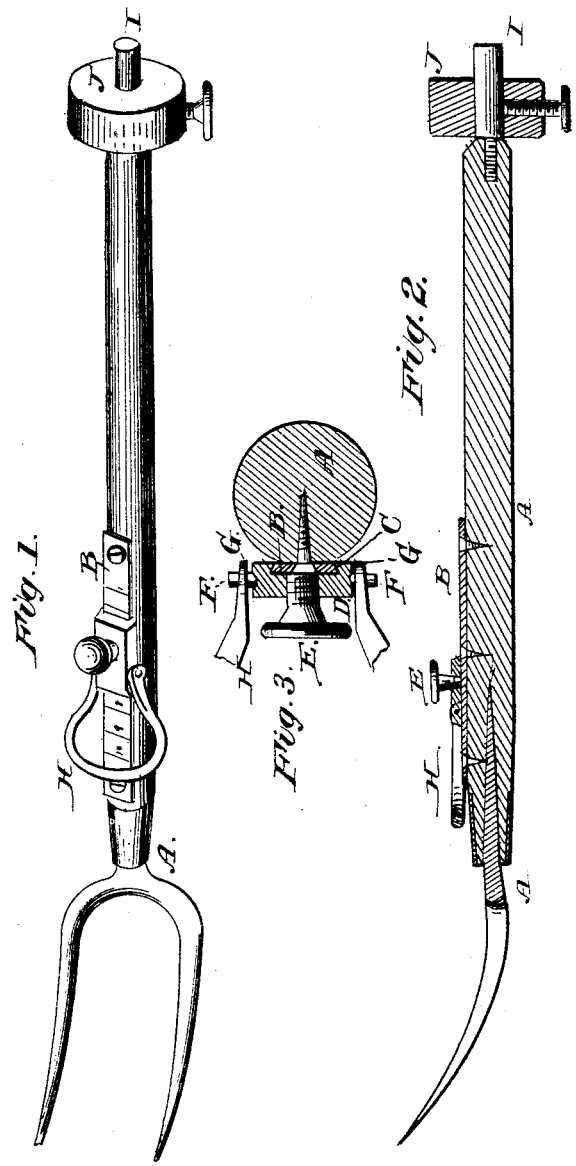

UNITED STATES PATENT OFFICE.

GEORGE L. RICHARDSON, OF BRUNSWICK, MAINE.

COMBINED HAY-FORK AND BALANCE.

SPECIFICATION forming part of Letters Patent No. 223,296, dated January 6, 1880.

Application filed December 3, 1879.

*To all whom it may concern:*

Be it known that I, GEORGE L. RICHARDSON, of Brunswick, in the county of Cumberland and State of Maine, have invented certain new and useful Improvements in Weighing Attachments to Hay-Forks; and I do hereby declare that the following is a full, clear, and exact description of the invention, which will enable others skilled in the art to which it appertains to make and use the same, reference being had to the accompanying drawings, which form a part of this specification.

Figure 1 is a perspective view. Fig. 2 is a longitudinal sectional view; and Fig. 3 is a cross-section.

Corresponding parts in the several figures are denoted by like letters of reference.

This invention relates to an improved weighing attachment to hay-forks, by which the weight of each forkful of hay may be determined, as will be hereinafter fully described, and particularly pointed out in the claim.

In the drawings hereto annexed, A represents a hay-fork, which may be of any suitable well-known construction. Longitudinally upon the handle of said fork is secured a metallic strip, B, having beveled sides, so as to fit in a dovetailed groove, C, in a slide, D, which latter is adjustable to any desired position upon the strip B, and may be secured in such position by a thumb screw, E, passing through a threaded perforation in said slide and pressing upon the strip B.

The slide D is provided with laterally-projecting balancing-studs F F, passing through the eyes G G in the ends of the bail H, by which the device is, in operation, held suspended.

The upper end of the fork-handle is provided with an upward-extending rod, I, upon which a counter-weight, J, is adjustable by means of a set-screw, K.

The strip B is graduated so as to indicate the weight of hay required to balance the counter-weight at the various positions of the slide.

In operation, after adjusting the slide to the desired position, the hay is taken upon the fork, which may then be held suspended by the bail H, when it may instantly be seen with sufficient accuracy whether the load is too large or too small.

By loosening the set-screw and moving the slide in either direction the weight of any load may be determined.

If the device should get out of order, it may be corrected by moving the counter-weight.

My invention is simple, inexpensive, and easily handled, and it may readily be applied to any ordinary hay-fork now in use.

Having thus described my invention, I claim and desire to secure by Letters Patent of the United States—

The combination, with a hay-fork, of the weighing attachment consisting of the strip B, having beveled sides, slide D, having dovetailed groove C, set-screw E, studs F F, and bail H, and the adjustable counter-weight J, all arranged and operating substantially as and for the purpose herein shown and specified.

In testimony that I claim the foregoing as my own I have hereto affixed my signature in presence of two witnesses.

GEO. L. RICHARDSON.

Witnesses:
  WM. L. SIMPSON,
  ANNIE D. RICHARDSON.